June 14, 1932.  S. S. MATTHES  1,863,021
CABLE CONNECTER
Filed Sept. 7, 1927
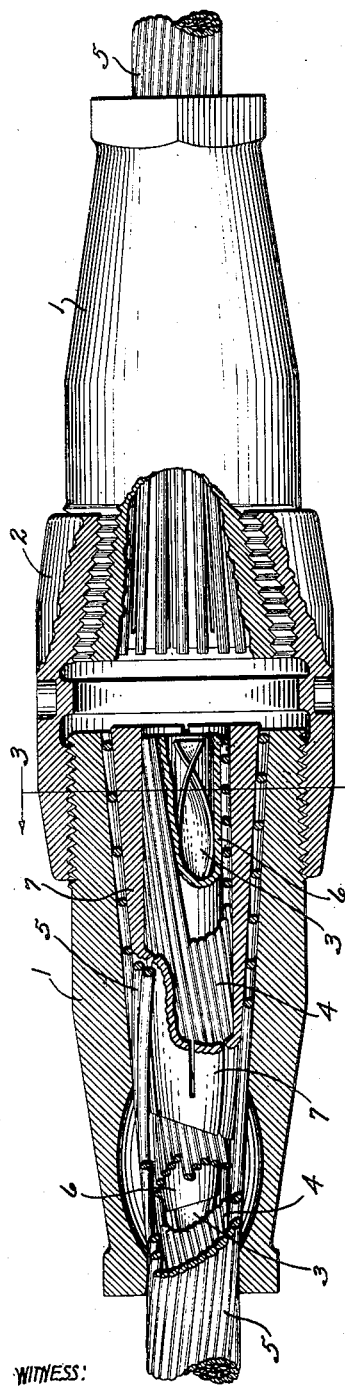
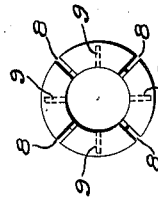
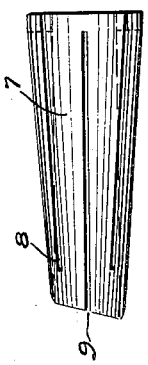
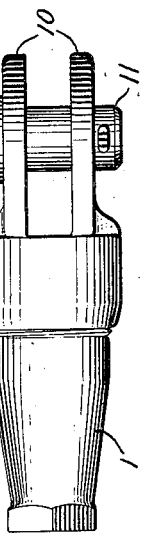
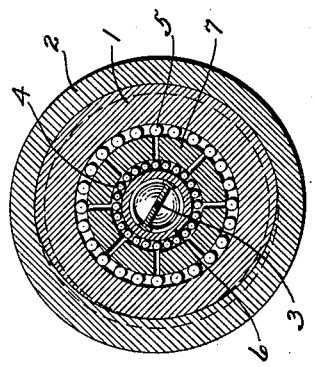
Inventor
SAMUEL S. MATTHES
By
Attorney
WITNESS:
H. J. Stromberger Patented June 14, 1932

1,863,021

UNITED STATES PATENT OFFICE

SAMUEL S. MATTHES, OF MANSFIELD, OHIO, ASSIGNOR TO THE OHIO BRASS COMPANY, OF MANSFIELD, OHIO, A CORPORATION OF NEW JERSEY

CABLE CONNECTER

Application filed September 7, 1927. Serial No. 217,938.

My invention relates to cable connecters and particularly connecters adapted for coupling the ends of hollow conductors.

The object of my invention is to provide a mechanical connecter for hollow wires which will avoid the necessary use of heat in any form, as for instance, in brazing, soldering or welding the conductors.

My invention resides in the new and novel construction, combination and relation of the various parts herein described and shown in the accompanying drawing.

In the drawing:

Fig. 1 is a longitudinal view in partial section of my invention.

Fig. 2 shows an exterior view of my invention as applied to a dead end device for anchoring the end of one cable.

Fig. 3 is a sectional view of Fig. 1 on the line 3—3.

Fig. 4 is a longitudinal side view of a sleeve which I employ.

Fig. 5 is an end view of Fig. 4.

Fig. 6 is a side view of an adjustable tubular wedge used as a part of my invention.

Fig. 7 is an end view of Fig. 6.

The joining of adjacent ends of tubular conductors presents problems differeing from those met with in joining the adjacent ends of solid or flexible conductors made up entirely of concentric layers of wires.

In the preferred embodiment of my invention I employ end members 1 having their inner or adjacent ends threaded to receive the coupling member 2.

I prefer to have the members 1 provided with a right hand and a left hand thread respectively so that it is only necessary to rotate the member 2 in one direction to draw the members 1 into their final position, as shown in Fig. 1.

The members 1 have a passage entirely therethrough and each is tapered with the large diameter at the inner end, having the smaller end as substantially the diameter of the exterior of the cable.

A hollow flexible conductor is made up in various ways and one method of construction is to form up a core of stripped material of continuous length and giving the same a helical formation. This helically formed strip acts as a core upon which the layers of wires which form the various layers are applied. In Fig. 1 the helical core 3 is shown as above described, and upon the core is wound the first layer 4 of a plurality of wires, but these are wound upon the core in the opposite direction from that in which the core is twisted. Upon the layer 4 is wound a second layer 5 of wires, and these are laid or given a twist in the opposite direction from the wires in the layer 4. In making the cable up in this manner, the core 3 offers a support to all of the wires in the layer 4 and the layer 4 offers a support to all the wires in the layer 5, and provides a flexible hollow conductor for electric currents. The core 3 may be formed with a helical twist before the layers 4 and 5 are applied, or it may be twisted coincidentally with the application of the layers 4 and 5 thereto.

As these cables run to considerable weight per unit length, a considerable force is required to grip the cable in the splicer and prevent its slipping. If the straight cable were inserted in the splicer as shown, with a tapered sleeve about the outside of the cable or interposed between the cable and inner tapered surface of the sleeve, it would be found that the core would not be strong enough to resist yielding and the cable would gradually slip through and out of the splicer, therefore, I provide means for relieving the core of this crushing strain.

In the drawing I have shown as interposed between the core 3 and the inner layer 4 of wires a tubular support 6 with one end tapered to better force its way into the cable from the end, simultaneously spreading the wires. The tubular support 6 is made as thin as possible and preferably of steel, as with steel I am able to secure maximum resistance to crushing or deformation. The core assists to some extent in preventing the crushing of the tubular support 6.

Interposed between the first layer 4 and the second layer 5 of wires and from the end of the cable is a yielding tapered tubular wedge 7 with a large diameter at the end of the cable, and the degree of taper of the outer surface corresponding with that of the inner surface of the members 1.

The parts thus described constitute the elements which make up my invention. In assembling the connecter upon the adjacent ends of cables to be connected, the ends of the cables are first passed through the orifice through their respective member 1. The tubular support 6 is then placed in position, as shown and described. The tubular wedge 7 is then positioned between the two layers of wires. The member 1 is then moved up to its final position, as far as it is possible to do so, by the hands of the operator. This positions the various parts approximately in their final position without bringing any special strain or pressure upon the parts. This allows the wires to adjust themselves to share equally in the load during movement of the wedge to its final holding position.

It will be noted that the wedge 7 is provided with a plurality of slots 8, which are slotted from the large end almost through to the small end, and alternately with these slots are other slots 9 which are slotted from the small end almost entirely through at the large end. This construction provides a yieldable or collapsible tubular wedge, which moves with the cable as strain is placed upon the cables, and adjusts itself as it moves toward the small end of the splicer member 1. After the cables, wedges and tubular supports have been assembled by hand, as before explained, the coupling member 2 is applied to the adjacent threaded ends of the members 1 and rotated in one direction, thereby drawing the members 1 toward each other until they are in their final position, as shown in Fig. 1.

After the parts are fully coupled up, as just described, and stress is placed upon the cables, the expanded end of the cables will move toward the small end of the members 1 and the parts will adjust themselves finally to a point where no further compression or air in the cable and wedges is permitted.

It will be seen that I have introduced into the cable a tubular support which takes the crushing strain away from the core 3 and relieves all danger of the core collapsing from any stress upon the joint.

It will be seen that there are no special tools required in making up the joint, at least no tools other than those ordinarily found in the kit of a construction or repair gang.

It will also be apparent that my invention can be employed to connect cables which have a soft or yielding core, such as a core of hemp, and around which concentric layers of wires are placed. In this case the tubular support would be inserted between the hemp core and the adjacent layer of wires.

It will be noted in connection with the ends of the tubular support and wedge members that the small end is not parallel with the opposite end. This has the advantage of more easily inserting the parts in position in the cable.

Attention is called to Fig. 3, which shows clearly how the parts are positioned relative to each other.

In Fig. 2 a modification of my invention is shown in which I employ a single member 1 and substitute for the coupling 2 a clevis type coupling comprising the spaced arms 10 and the bolt 11, and to this bolt can be attached a fitting which in turn is connected to a support.

The members 6 and 7 may be made of a high strength bronze, such as phosphorus, manganese, silicon, etc., which has a higher conductivity than steel, but it does not have the strength of steel, but will be found absolutely rustless when used under certain atmospheric conditions.

The extreme outer end of the members 1 is just large enough to admit the cable under normal conditions, and will, therefore, prevent the spreading of the strands or wires outside the connecter.

There will be modifications which will be apparent to those skilled in the art, but I wish to be limited only by my claims.

I claim as my invention:

1. A cable coupling for a hollow stranded cable having a plurality of layers of strands, comprising a connecting member having a bore to receive the cable and within which the cable is compressed and tubular means with parallel sides positioned interior of the cable to support the strands and tapered means between the strand layers to compress the strands against the connecting member and the tubular means.

2. A connecter for hollow stranded cables having a twisted core and a plurality of layers of strands, comprising a pair of end members each having a tapered bore, means to couple the end members together, a tubular support positioned in each end member and having an outer surface parallel to the cable axis, said support to be inserted longitudinally of the cable between the core and adjacent inner layer of strands and to move with the cable, and a tubular wedge for each end member to be inserted between the said layer of strands and the next outer layer of strands to form an enlarged end on the cable.

3. A connecter for stranded cable having a core and a plurality of layers of strands, comprising a pair of end members and a means to couple the members together, each member having a bore of varying diameters along its length, a tubular support in each member to support the inner layer of strands and having a straight outer surface parallel to the axis of the cable, radially adjustable tubular wedge for each end member and positioned between adjacent layers of strands and mounted to compress the strands against the walls of the member and the support and having a tapered outer surface and an inner surface parallel to the axis of the cable.

4. The combination with a pair of stranded cables, each provided with a twisted core having an I-beam section surrounded by a plurality of layers of strands of a pair of end members connected together and each having a bore to receive the end of a cable, each member having positioned within its bore a tubular member having a yieldable wall to move radially and to be inserted between the layers of strands and cooperate with the said end member to bring pressure upon the strands therebetween and simultaneously move the strands within the tubular member inwardly and means consisting of a tubular support having a straight outer surface parallel to the axis of the cable to resist said movement of the strands inwardly and maintain the strands out of contact with the core and prevent pressure upon the core.

5. A connection comprising a pair of stranded cables, each having a twisted core surrounded by a plurality of strands, a pair of end members connected together and each having a bore to receive an end of one of the cables, each member having means to separate the strands from the core adjacent the end of the cable, and yieldable means to move axially and transversely of the end member and the said first means to compress the strands, the first means preventing the stress from being applied to the core.

6. A connecter for hollow stranded cable having a plurality of layers of strands, comprising a connecting member having a tapered bore to receive the cable end, a hollow support having straight and parallel sides to be placed interiorly of the inner layer of strands to maintain the layer in position and prevent the layer being crushed inwardly when the cable is under compression, and means to bring compression upon the strands and support.

7. A joint comprising a pair of end members detachably secured together, a tapered bore through each end member, a cable positioned in each end member and having a flat core with narrow transversely disposed edges upon which are mounted a plurality of strands, a tubular member having a straight inner wall and a straight outer wall with a tapered end positioned within the cable and exterior of the core to prevent pressure being applied to the core from without, a tubular wedge interposed in the strands between the tubular member and its end member to bring compression upon the strands and form an enlarged head and prevent the longitudinal withdrawal of the cables.

In testimony whereof I affix my signature.

SAMUEL S. MATTHES.